United States Patent
Bang et al.

(10) Patent No.: US 7,870,364 B2
(45) Date of Patent: Jan. 11, 2011

(54) RECONFIGURABLE APPARATUS AND METHOD FOR PROVIDING MULTIPLE MODES

(75) Inventors: Ji-Hoon Bang, Yongin-si (KR); Kwang-Chul Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 12/153,409

(22) Filed: May 19, 2008

(65) Prior Publication Data

US 2009/0193238 A1    Jul. 30, 2009

(30) Foreign Application Priority Data

Jan. 30, 2008    (KR) .................... 10-2008-0009495

(51) Int. Cl.
    G06F 15/76    (2006.01)
    G06F 15/80    (2006.01)
(52) U.S. Cl. .......................................... 712/15; 712/17
(58) Field of Classification Search ................. 712/15, 712/17
    See application file for complete search history.

(56) References Cited

U.S. PATENT DOCUMENTS

| | | | |
|---|---|---|---|
| 5,805,907 A * | 9/1998 | Loper et al. ................. 713/300 |
| 6,366,998 B1 | 4/2002 | Mohamed |
| 7,127,590 B1 | 10/2006 | Lindquist |
| 2002/0128037 A1 | 9/2002 | Schmidt |
| 2003/0140281 A1 * | 7/2003 | Fu et al. ........................ 714/38 |
| 2004/0103263 A1 | 5/2004 | Colavin et al. |
| 2004/0255186 A1 * | 12/2004 | Lau ................................ 714/6 |
| 2005/0066079 A1 * | 3/2005 | Luick ........................... 710/36 |

FOREIGN PATENT DOCUMENTS

| | | |
|---|---|---|
| KR | 1020010095074 | 11/2001 |
| KR | 100665615 | 12/2006 |
| KR | 100681199 | 2/2007 |
| KR | 1020070080089 | 8/2007 |

* cited by examiner

*Primary Examiner*—Daniel Pan
(74) *Attorney, Agent, or Firm*—NSIP Law (57) ABSTRACT

A reconfigurable processor (RP) structure is provided, and particularly, a multi-mode providing apparatus including an exclusive coarse-grained array unit for each mode and a multi-mode providing method thereof are provided. The multi-mode providing apparatus includes: at least one reconfigurable operation mode execution unit performing a plurality of operations for processing a predetermined operation mode; a common coarse-grained array unit shared temporally by the at least one reconfigurable operation mode execution unit, and performing a main processing operation set to be performed by the common coarse-grained array unit, among the plurality of operations; and a controller determining whether the common coarse-grained array unit is available, and according to the result of the determination controlling the at least one reconfigurable operation mode execution unit so that the common coarse-grained array unit or an exclusive coarse-grained array unit performs the main processing operation, the exclusive coarse-grained array unit included in the at least one reconfigurable operation mode execution unit. Therefore, it is possible to reduce a delay time for data processing while reducing the size of hardware.

11 Claims, 8 Drawing Sheets

RECONFIGURABLE APPARATUS AND METHOD FOR PROVIDING MULTIPLE MODES

CROSS REFERENCE TO RELATED APPLICATIONS

This application claims priority from Korean Patent Application No. 10-2008-009495, filed on Jan. 30, 2008, the disclosure of which is incorporated herein in its entirety by reference.

BACKGROUND OF THE INVENTION

1. Field of the Invention

The present invention relates to a structure of a reconfigurable processor (RP), and more particularly, to a multi-core processor using a coarse-grained array.

2. Description of the Related Art

A reconfigurable architecture means a circuit in which built-in functions can be changed according to a user's intention. A reconfigurable processor which is used in a system or terminal to operate a mode, for example, a standardized communication mode, a multimedia mode, etc., can be implemented by combining a Very Long Instruction Word (VLIW) processor with a Coarse Grained Array (CGA).

However, in order to provide multiple modes in which various applications operate simultaneously using such a reconfigurable processor, a plurality of reconfigurable processors each including a VLIW processor and a CGA array, corresponding to the number of the modes, have to be provided. However, this configuration makes the hardware of the CGA array complicated, and is disadvantageous when it is applied to a user terminal, etc. which have to have the characteristics of low power consumption and low capacity.

SUMMARY OF THE INVENTION

The present invention provides an apparatus and method which provide multiple modes and have low power consumption, low capacity, and high performance.

According to an aspect of the present invention, there is provided an apparatus for providing multiple modes, including: at least one reconfigurable operation mode execution unit performing a plurality of operations for processing a predetermined operation mode; a common coarse-grained array unit shared temporally by the at least one reconfigurable operation mode execution unit, and performing a main processing operation set to be performed by the common coarse-grained array unit, among the plurality of operations; and a controller determining whether the common coarse-grained array unit is available, and according to the result of the determination controlling the at least one reconfigurable operation mode execution unit so that the common coarse-grained array unit or an exclusive coarse-grained array unit performs the main processing operation, the exclusive coarse-grained array unit included in the at least one reconfigurable operation mode execution unit.

According to another aspect of the present invention, there is provided a method for providing multiple modes, the method providing the multiple modes by performing a main control operation set to be performed by a core unit and a main processing operation set to be performed by a coarse-grained array unit, the method including: if the main processing operation has to be performed while a first operation mode is performed, determining whether a common coarse-grained array unit shared temporally to perform operations of the multiple modes performs an operation for performing a second operation mode which is different from the first operation mode; and if the common coarse-grained array unit performs the second operation mode, performing the main processing operation using an exclusive coarse-grained array unit for performing the main processing operation of the first operation mode.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 1:
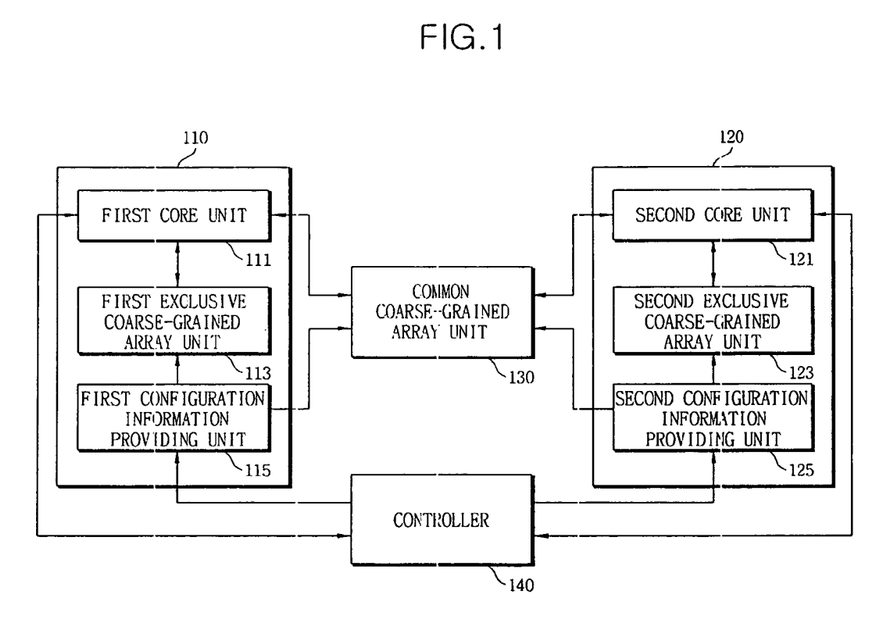
FIG. 1 is a block diagram of an apparatus for providing multiples modes, according to an embodiment of the present invention.

FIG. 1 is a block diagram of an apparatus for providing multiple modes, according to an embodiment of the present invention.

Referring to FIG. 1, the multi-mode providing apparatus includes a first operation mode execution unit 110, a second operation mode execution unit 120, a common coarse-grained array unit 130, and a controller 140. The multi-mode providing apparatus can process two or more operation modes simultaneously.

The operation modes may include communications/broadcasting modes for wireless LAN communications, cellular communications, DMB/DVB, etc., multimedia modes (for example, a H.264/MPEG playback mode) in which a variety of broadcasting/communication modes are combined with one another, etc., however, the present invention is not limited to these. Also, the multi-mode providing apparatus uses reconfigurable processors, and the first and second operation mode execution units 110 and 120 and the common coarse-grained array unit 130 are reconfigured according to a change in an operation mode, and perform predetermined operations in the changed operation mode.

Meanwhile, the predetermined operations include a main control operation that is to be executed in a core unit, and a main processing operation that is to be executed in a coarse-grained array unit. The main processing operation that is to be executed in the coarse-grained array unit includes an operation (for example, an iteration loop) requiring iteration, in which the amount of data processing exceeds a predetermined threshold value. According to an embodiment of the present invention, main control operations and main processing operations are separated in advance from each other according to operation modes.

The first operation mode execution unit 110 and the second operation mode execution unit 120 share the common coarse-grained array unit 130. When the common coarse-grained array unit 130 executes a main processing operation in some operation mode, the first and second operation mode execution units 110 and 120 execute main processing operations according to each operation mode using exclusive coarse-grained array units 113 and 123 therein.

The first operation mode execution unit 110 includes a first core unit 111, a first exclusive coarse-grained array unit 113, and a first configuration information providing unit 115. Likewise, the second operation mode execution unit 120 includes a second core unit 121, a second exclusive coarse-grained array unit 123, and a second configuration information providing unit 125. FIG. 1 shows a case where two operation mode execution units each including a core unit, an exclusive coarse-grained array unit, and a configuration storage unit are provided, however, N operation mode execution units may be used (N is a natural number).

The first and second core units 111 and 121 each perform main control operations which are executed separately from main processing operations, among various operations according to operation modes. According to an embodiment of the present invention, the first and second core units 111 and 121 are Very Long Instruction Word (VLIW) processors.

The first and second core units 111 and 121 store instruction information in which commands for executing operation modes are converted into instructions which can be processed by hardware.

Also, the first and second core units 111 and 121 include processing units (not shown) that perform predetermined calculations according to the instruction information and store the results of the calculations. The processing units can include function units and register files which store the results of the calculations. The function units are used for the calculations, and each register file is a group of one or more registers, and temporarily stores data that is to be used or has been calculated by each function unit.

According to an embodiment of the present invention, the first and second core units 111 and 121 operate independently for each operation mode so that the operation of one core unit does not influence the operation of the other core unit. Accordingly, for example, when the first core unit 111 has to use the result processed by the second core unit 121 in order to perform a predetermined process, the first core unit 111 does not need to wait until the processing of the second core unit 121 is complete.

Each of the coarse-grained array units 113, 123, and 130 may be a reconfigurable array in which the size of data input to processing units included therein is 1 word. Each of the coarse-grained array units 113, 123, and 130 includes a plurality of processing units (not shown). Each processing unit may include a function unit and at least one register file.

The exclusive coarse-grained array units 113 and 123 perform predetermined main processing operations. According to an embodiment of the present invention, the configuration information providing units 115 and 125 provide configuration information about the operations of the exclusive coarse-grained array units 113 and 123 and the common coarse-grained array unit 130 according to the operation modes.

For example, when the first operation mode execution unit 110 performs a first operation mode, the first configuration information providing unit 115 stores configuration information required for the first exclusive coarse-grained array unit 113 and the common coarse-grained array unit 130 to perform a main processing operation among operations for the first operation mode.

The configuration information includes information about calculations to be performed by the function units included in the coarse-grained array units 113, 123, and 130, information about a register file of a processing unit in which stored data to be used for the calculations by the function units, or information about whether to store values generated by the calculations in a register file or in an external memory, etc.

The common coarse-grained array unit 130 is sequentially occupied by the first and second operation mode execution units 110 and 120, and performs a predetermined main processing operation. That is, the common coarse-grained array unit 130 is shared temporally by at least one of the first and second operation mode execution units 110 and 120.

According to an embodiment of the present invention, when the common coarse-grained array unit 130 is not available, the first and second exclusive coarse-grained array units 113 and 123 perform the main processing operation, instead of the common coarse-grained array unit 130. Since the first and second exclusive coarse-grained array units 113 and 123 are substitutes for the common coarse-grained array unit 130, the size of each of the first and second exclusive coarse-grained array units 113 and 123 is generally designed to be smaller than that of the common coarse-grained array unit 130.

The controller 140 determines whether the common coarse-grained array unit 130 is available, and according to the result of the determination controls the first and second operation mode execution units 110 and 120 to perform the main processing operation using the common coarse-grained array unit 130 or the exclusive coarse-grained array units 113 and 123.

A process of performing the main processing operation will be described below.

If it is determined that the first operation mode execution unit 110 has to perform the main processing operation, the first operation mode execution unit 110 transfers to the controller 140 a signal for requesting use of the common coarse-grained array unit 130. The controller 140 transfers a signal for allowing use of the common coarse-grained array unit 130 to the first operation mode execution unit 110, if the common coarse-grained array unit 130 is available, thus allowing the first operation mode execution unit 110 to use the common coarse-grained array unit 130, because processing data using the common coarse-grained array unit 130 capable of processing a large amount of data is efficient.

If the common coarse-grained array unit 130 is not available, the controller 140 transfers a signal indicating that use of the common coarse-grained array unit 130 is impossible to the first operation mode execution unit 110, thus controlling the first operation mode execution unit 110 to perform the main processing operation using the first exclusive coarse-grained array unit 113.

A predetermined operation mode can be carried out by performing several main control operations and several main processing operations. Accordingly, if the common coarse-grained array unit 130 is not available until the several main processing operations are all terminated, the main processing operations are all performed by the first exclusive coarse-grained array unit 113.

According to another embodiment of the present invention, in the case of an operation mode for an application which can be processed only using the exclusive coarse-grained array units 113 and 123, a loop operation can be performed using only the exclusive coarse-grained array units 113 and 123 without using the common coarse-grained array unit 130. In this case, since the common coarse-grained array unit 130 is not used, the operation mode can be provided with relatively low power consumption.

Meanwhile, the first and second core units 111 and 121 can transfer to the controller 140 use information indicating whether a predetermined operation mode is currently performed. Based on the use information, the controller 140 prevents a supply voltage from being supplied to the first or second operation mode execution unit 110 or 120 when it does not operate, thereby reducing power consumption.

Figure 2:
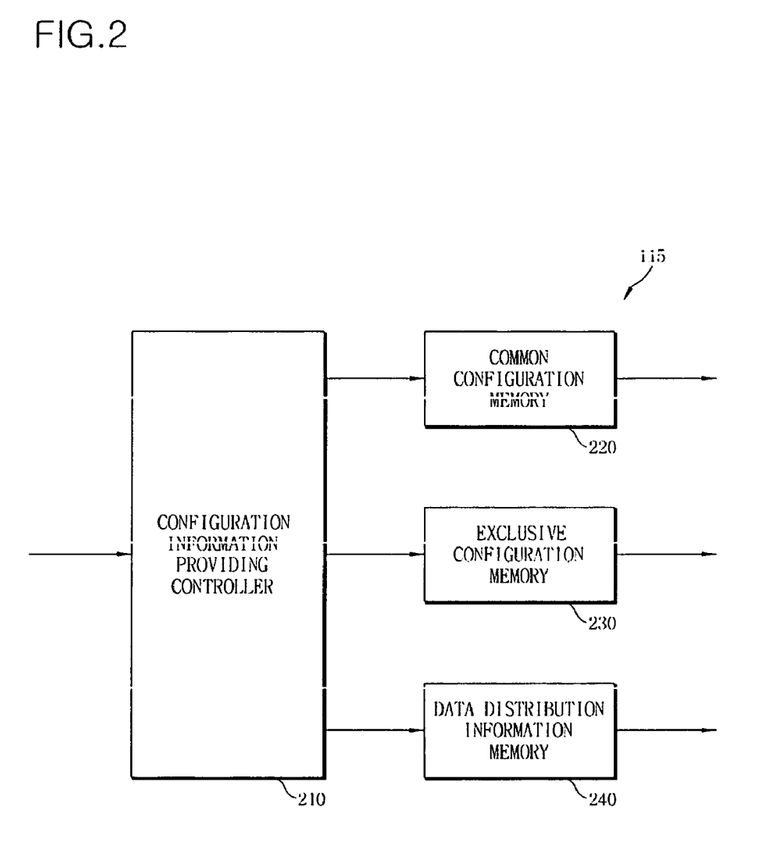
FIG. 2 is a block diagram of a first configuration information providing unit illustrated in FIG. 1.

FIG. 2 is a block diagram of the first configuration information providing unit 115 illustrated in FIG. 1.

The first configuration information providing unit 115 includes a configuration information providing controller 210, a common configuration memory 220, an exclusive configuration memory 230, and a data distribution information memory 240.

The common configuration memory 220 stores configuration information about the operation of the common coarse-grained array unit 130. The configuration information stored in the common configuration memory 220 includes information about calculations to be performed by function units included in the common coarse-grained array unit 130, information about a register file of a processing unit in which stored data to be used for the calculations by the function units, or information about whether to store values generated by the calculations in a register file or in an external memory, etc.

The exclusive configuration memory 230 stores configuration information about the operation of the first exclusive coarse-grained array unit 113. The configuration information stored in the exclusive configuration memory 230 includes information about calculations to be performed by function units included in the exclusive coarse-grained array unit 113, information about a register file of a processing unit in which stored data to be used for the calculations by the function units, or information about whether to store values generated by the calculations in a register file or in an external memory, etc.

The configuration information providing controller 210 provides the configuration information stored in the common configuration memory 220 to the common coarse-grained array unit 130, or the configuration information stored in the exclusive configuration memory 230 to the first exclusive coarse-grained array unit 113, on the basis of a signal ECGA_MODE which indicates whether the common coarse-grained array unit 130 is being used and which is received from the controller 140.

According to an embodiment of the present invention, when the common coarse-grained array unit 130 becomes available while the first exclusive coarse-grained array unit 113 performs a main processing operation, the configuration information providing controller 210 transfers configuration information about the operation of the first exclusive coarse-grained array unit 113 to the common coarse-grained array unit 130 so that the main processing operation can be performed by the common coarse-grained array unit 130.

For this, the configuration information providing unit 210 converts address information of the exclusive configuration memory 230, including configuration information instructing the main processing operation, into address information of the common configuration memory 220. The configuration information providing controller 210 transfers the converted address information to the common configuration memory 220 to provide configuration information instructing a next operation to the common coarse-grained array unit 130, thereby controlling the performing of the main processing operation.

Meanwhile, when the main processing operation which has been processed by the exclusive coarse-grained array unit 113 is performed by the common coarse-grained array unit 130, a data value obtained by data processing of the exclusive coarse-grained array unit 113 also has to be provided to the common coarse-grained array unit 130.

In detail, according to an embodiment of the present invention, when the common coarse-grained array unit 130 becomes available while the exclusive coarse-grained array unit 113 performs the main processing operation, the configuration information providing controller 210 controls provision of configuration information to distribute to the common coarse-grained array unit 130 a data value generated when the main processing operation stored in the data distribution information memory 240 is performed. The configuration information providing controller 210 can control provision of configuration information for data distribution to perform the inverse process of the above-described process, as necessary.

Since the configuration of the second configuration information providing unit 125 corresponds to that of the first configuration information providing unit 15, a detailed description thereof will be omitted.

Figure 3A:
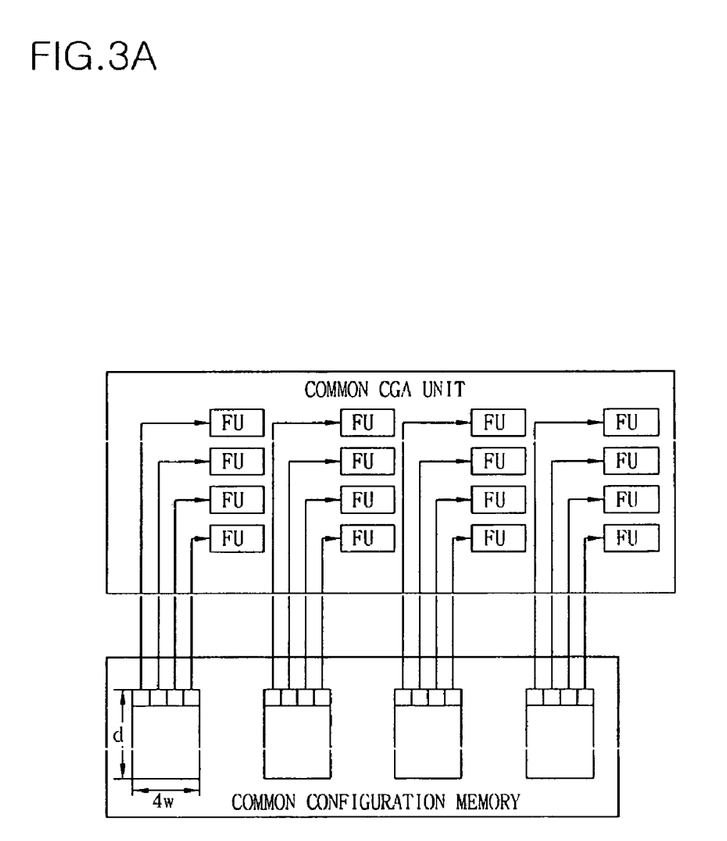
FIGS. 3A and 3B are views for explaining a process in which configuration information included in the first configuration information providing unit illustrated in FIG. 2 is transferred to a coarse-grained array unit.
Figure 3B:
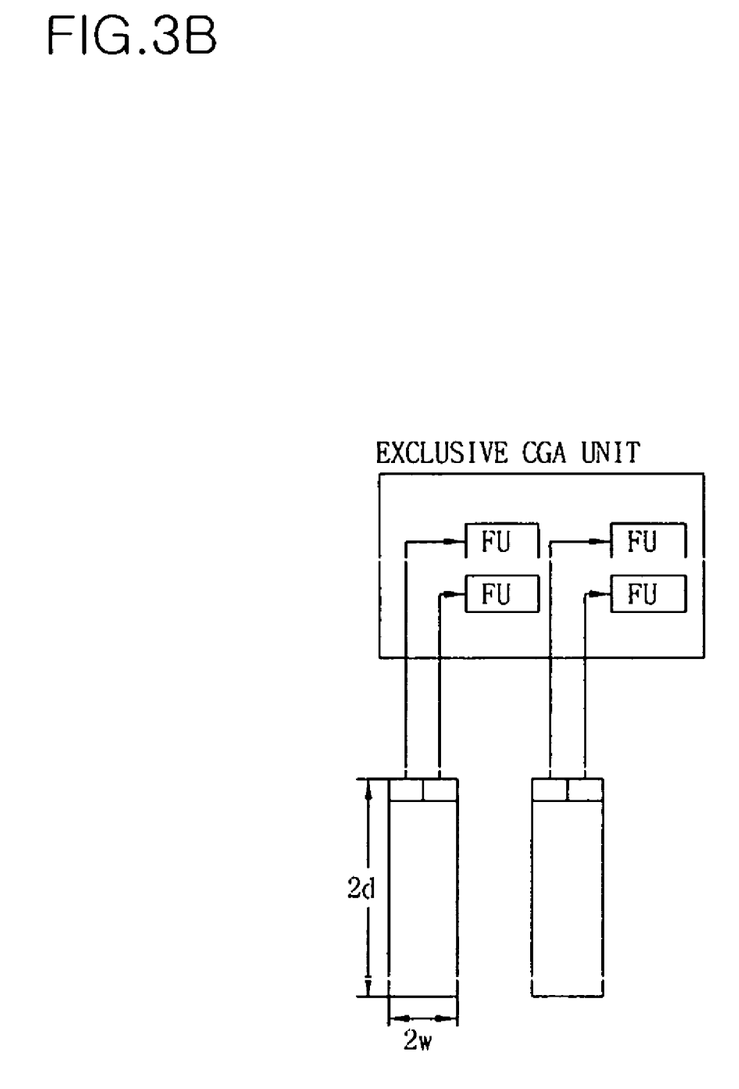

FIGS. 3A and 3B are views for explaining a process in which configuration information included in the first configuration information providing unit illustrated in FIG. 2 is transferred to a coarse-grained array unit;

Each piece of configuration information from a configuration information memory is transferred to the corresponding function units of a common coarse-grained array unit. Processing of the configuration information transferred to the function units can be carried out in one cycle.

As illustrated in FIG. 3A, each piece of configuration information in the common configuration memory is transferred to four function units of the common coarse-grained array unit (that is, a common CGA unit), and a sub memory can be assigned to each column of the common coarse-grained array unit. Accordingly, the memory width of the common configuration memory is set to include four pieces of configuration information in an address.

In FIG. 3A, "d" represents a depth of the common configuration memory, and configuration information at a next timing in the common configuration memory is transferred to the common coarse-grained array unit whenever "d" is incremented by 1.

As illustrated in FIG. 3B, data in an exclusive configuration memory is transferred to two function units of the exclusive coarse-grained array unit, and a sub memory can be assigned to each column of the exclusive coarse-grained array unit. Accordingly, the memory width of the exclusive configuration memory is designed to include two pieces of configuration information in an address.

Figure 4:
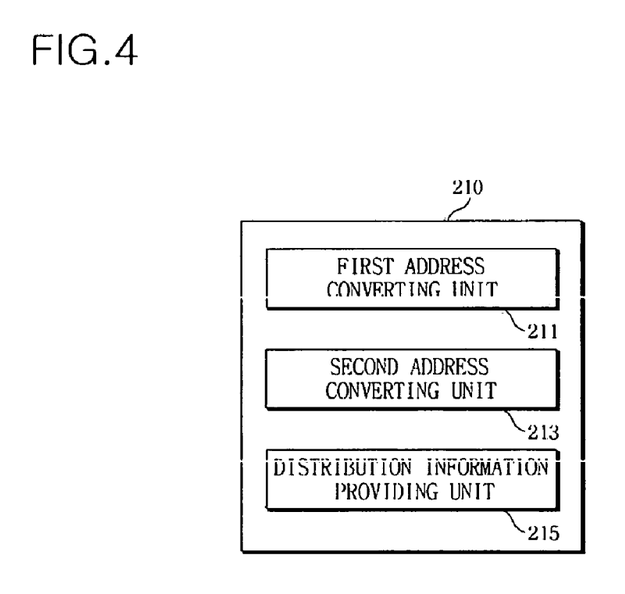
FIG. 4 is a block diagram of a configuration information providing controller illustrated in FIG. 2.

FIG. 4 is a block diagram of the configuration information providing controller 210 illustrated in FIG. 2.

Referring to FIGS. 2 and 4, the configuration information providing controller 210 includes a first address converting unit 211, a second address converting unit 213, and a distribution information providing unit 215.

The first address converting unit 211 converts address information of the common configuration memory 220 storing predetermined configuration information, into address information of the exclusive configuration memory 230. The converted address information of the exclusive configuration memory 230 indicates an address of an exclusive configuration memory including configuration information instructing a main processing operation that is to be performed in the next step. The converted address information of the exclusive configuration memory 230 is provided to the exclusive configuration memory 230.

The second address converting unit 213 converts the address information of the exclusive configuration memory 230 into address information of the common configuration memory 220. The converted address information of the common configuration memory 220 indicates an address of a common configuration memory including configuration information instructing a main processing operation that is to be performed in the next step by the common configuration memory 220. The converted address information of the common configuration memory 220 is provided to the common configuration memory 220.

The distribution information providing unit 215 controls provision of information which is stored in the data distribution information memory 240 and used to distribute data between the exclusive coarse-grained array unit 113 and the common coarse-grained array unit 130.

Figure 5:
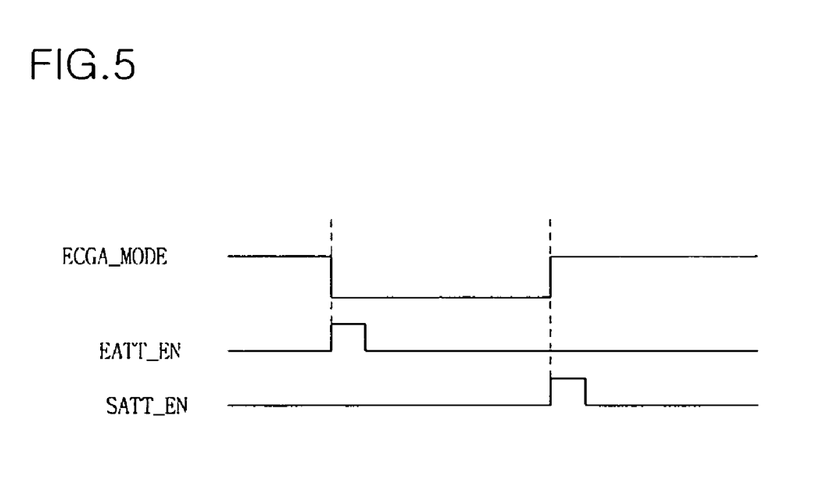
FIG. 5 is a timing diagram showing timings for accessing first and second address converting units illustrated in FIG. 4.

FIG. 5 is a timing diagram showing timings for accessing the first and second address converting units 211 and 213 of the configuration information providing controller 210 illustrated in FIG. 4. The following descriptions will be given with reference to FIGS. 1, 2, 4, and 5.

FIG. 5 is a view showing timings for reading addresses obtained from the first and second address converting units 211 and 213 when a signal ECGA_MODE indicating whether the common coarse-grained array unit 130 is being used varies. If the signal ECGA_MODE is "high", this represents that the common coarse-grained array unit 130 is available. If the signal ECGA_MODE is "low", this represents that the common coarse-grained array unit 130 is not available.

Accordingly, if the signal ECGA_MODE goes from "high" to "low", a signal EATT_EN for enabling the first address converting unit 211 is applied to the first address converting unit 211, address information of the common configuration memory 220 indicating configuration information instructing an operation which is currently performed is converted into address information of the exclusive configuration memory 230, and then the converted address information is provided to the exclusive configuration memory 230. Meanwhile, if the signal ECGA_MODE goes from "low" to "high", a signal SATT_EN for enabling the second address converting unit 214 is applied to the second address converting unit 213, address information of the exclusive configuration memory 230 indicating configuration information instructing an operation which is currently performed is converted into address information of the common configuration memory 220, and then the converted address information is provided to the common configuration memory 220.

Figure 6:
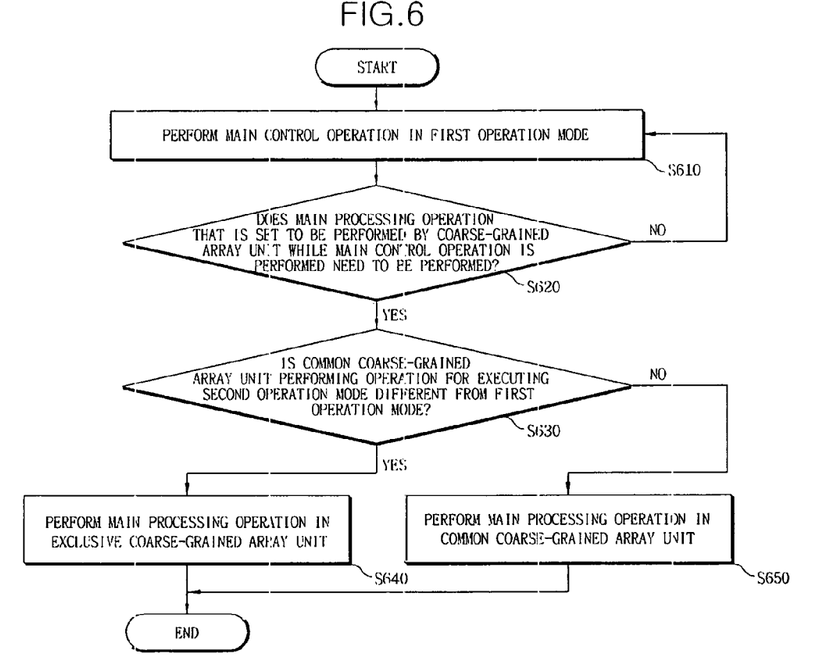
FIG. 6 is a flowchart of a method of providing multiple modes, according to an embodiment of the present invention.

FIG. 6 is a flowchart of a method of providing multiple modes, according to an embodiment of the present invention.

In a first operation mode, a main control operation which is set to be performed by a core unit is performed (step S610).

While the main control operation is performed, it is determined whether to perform a main processing operation that is set to be performed by a coarse-grained array unit (step S620).

In step S630 it is determined whether a common coarse-grained array unit which is shared temporally to perform the operations of multiple modes is performing an operation for executing a second operation mode which is different from the first operation mode.

If it is determined that the common coarse-grained array unit performs the second operation mode, an exclusive coarse-grained array unit for performing a main processing operation of the first operation mode, instead of the common coarse-grained array unit, performs the main processing operation (step S640).

If the common coarse-grained array unit is available because it does not perform any other operation mode, the common coarse-grained array unit performs the main processing operation (step S650).

Figure 7:
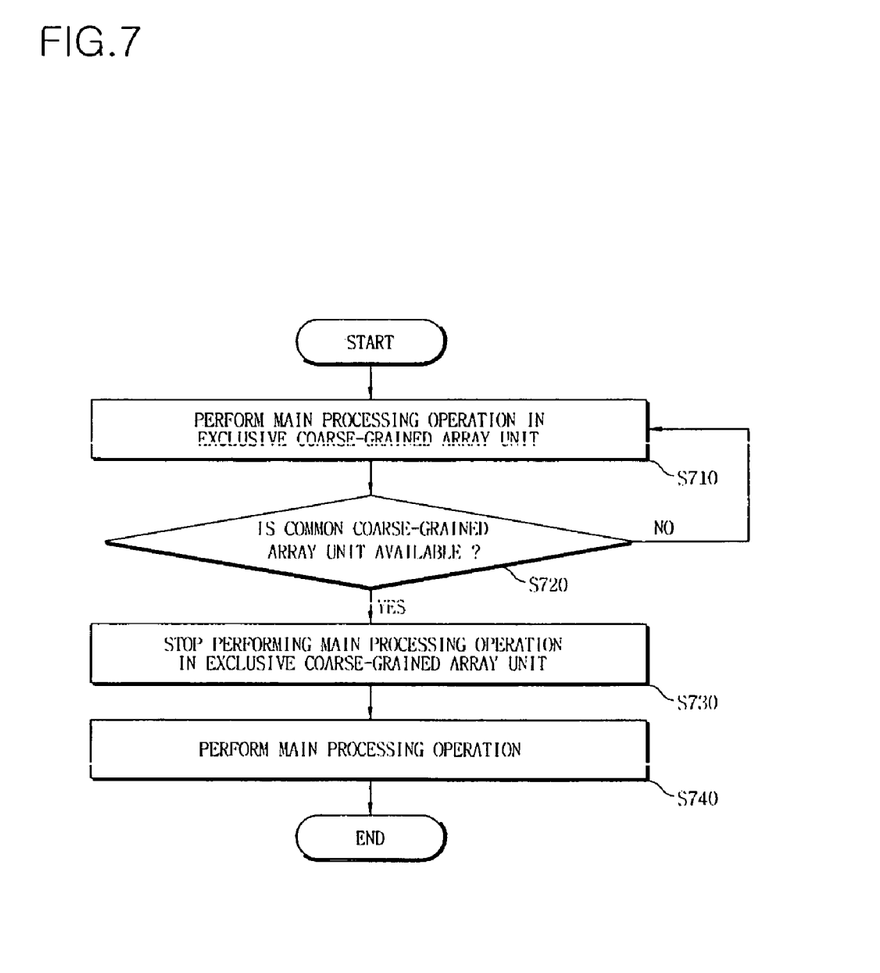
FIG. 7 is a flowchart of a method of providing multiple modes, according to another embodiment of the present invention.

FIG. 7 is a flowchart of a method of providing multiple modes, according to another embodiment of the present invention.

Like operation S640 of FIG. 6, while an exclusive coarse-grained array unit performs a main processing operation (step S710), it is determined whether a common coarse-grained array unit is available (step S720).

If the common coarse-grained array unit is available, the exclusive coarse-grained array unit stops performing the main processing operation (step S730), and the common coarse-grained array unit performs the stopped main processing operation (step S740).

According to an embodiment of the present invention, step S730 can be carried out by the following process.

First, an address of the common configuration memory in which configuration information corresponding to configuration information instructing the main processing operation exists is searched for. Then, configuration information located in address next to the searched address is transferred to the common coarse-grained array unit. Data processing results generated before the operation of the exclusive coarse-grained array unit is stopped are distributed to the common coarse-grained array unit.

Figure 8:
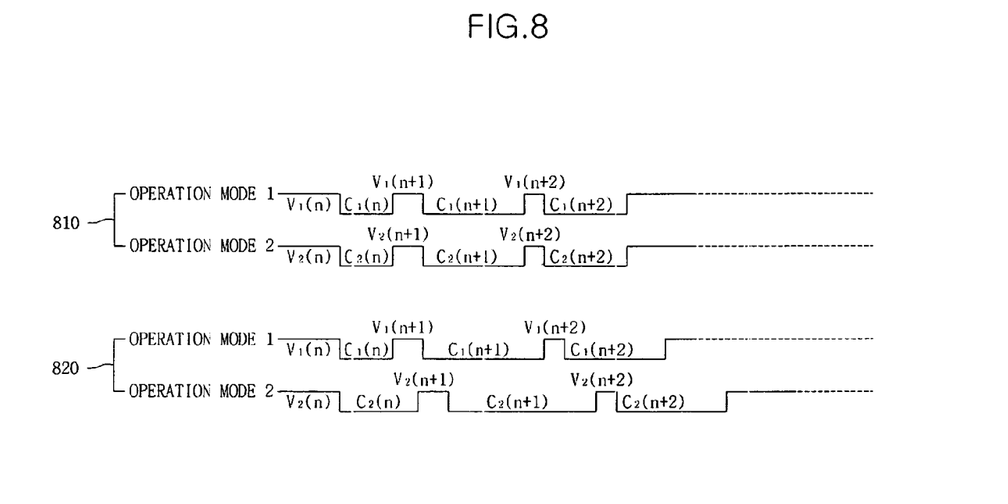
FIG. 8 shows waveforms of operation mode signals when the multi-mode providing method illustrated in FIG. 6 is used.

FIG. 8 shows waveforms of operation mode signals when the multi-mode providing method illustrated in FIG. 6 is used.

In FIG. 8, reference number 810 designates a timing diagram of a conventional case where a multi-mode providing apparatus provides an operation mode 1 and an operation mode 2 using two reconfigurable processors each including a core unit and a coarse-grained array unit. Reference number 820 designates a timing diagram showing operation processing results when the multi-mode providing apparatus and method according to an embodiment of the present invention are applied. In FIG. 8, $V_i(n)$ represents execution timing of a main control operation which is set to be performed by a core unit, and $C_i(n)$ represents execution timing of a main control operation which is set to be performed by a coarse-grained array unit.

In the conventional case, since the core unit and the coarse-grained array unit are configured to be used for each operation mode, no time delay occurs. However, since the number of coarse-grained array units should increase when the number of operation modes increases, the hardware structure becomes complicated, and complicated hardware is disadvantageous when it is applied to a terminal, etc., which have to have the characteristics of low power consumption and low capacity.

However, according to the current embodiment of the present invention denoted by reference number 820, it is possible to provide operation mode 1 and operation mode 2 with little delay while reducing the size of hardware occupied by the coarse-grained array unit, compared to the conventional case. For convenience of description, FIG. 8 shows a case where two operation modes are provided, but, even if the number of operation modes increases, the operation modes can be more effectively provided compared to the conventional case. If a common coarse-grained array unit capable of processing a large amount of data is not available, the corresponding operation can be performed using an exclusive coarse-grained array unit prepared for each mode.

According to an embodiment of the present invention, since the exclusive coarse-grained array unit is provided for each core for performing each operation mode, and the exclusive coarse-grained array unit can perform the corresponding operation mode when the common coarse-grained array unit is not available, the multi-mode providing apparatus and method can reduce a delay time for data processing while reducing the size of hardware.

Also, according to an embodiment of the present invention, the multi-mode providing apparatus and method can reduce power consumption by preventing a supply voltage from being applied to an operation mode execution unit which does not operate.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An apparatus for providing multiple modes, the apparatus comprising:
   a plurality of reconfigurable operation mode execution units for performing operations for processing a respective predetermined operation mode, each reconfigurable operation mode execution unit including an exclusive coarse-grained array that is not shared with other reconfigurable operation mode execution units;
   a common coarse-grained array unit shared temporally by the plurality of reconfigurable operation mode execution units, and for performing a respective processing operation; and
   a controller for determining whether the common coarse-grained array unit is available,
   wherein, if a respective reconfigurable operation mode execution unit requests use of the common coarse-grained array to process a respective processing operation, and if the coarse-grained array is available, the controller transfers a signal for allowing use of the common coarse-grained array to the respective operation mode execution unit, and if the coarse-grained array is not available, the controller controls the respective reconfigurable operation mode execution unit to process the respective processing operation with the exclusive coarse-grained array of the respective reconfigurable operation mode execution unit.

2. The apparatus of claim 1, wherein each reconfigurable operation mode execution unit further comprises:
   a core unit performing a control operation performed separately from the processing operation; and
   a configuration information providing unit providing configuration information about operations of the exclusive coarse-grained array unit and the common coarse-grained array unit, according to the plurality of operation modes.

3. The apparatus of claim 2, wherein the core unit of the respective reconfigurable operation mode execution unit operates independently for each operation mode so as not to be influenced by the operation a core unit of another reconfigurable operation mode execution unit.

4. The apparatus of claim 2, wherein each configuration information providing unit comprises:
   a common configuration memory storing configuration information about an operation of the common coarse-grained array unit;
   an exclusive configuration memory storing configuration information about an operation of the exclusive coarse-grained array unit;
   a data distribution information memory storing configuration information for distributing data generated by data processing between the exclusive coarse-grained array unit and the common coarse-grained array unit; and
   a configuration information providing controller controlling provision of the configuration information stored in the common configuration memory, the exclusive configuration memory, or the data distribution information memory.

5. The apparatus of claim 4, wherein, when the common coarse-grained array unit becomes available while the respective processing operation is being performed by the exclusive coarse-grained array unit of the respective reconfigurable operation mode execution unit, the configuration information providing controller converts address information of an exclusive configuration memory including configuration information instructing the respective processing operation for execution, into address information of the common configuration memory, and provides configuration information instructing an operation of a next step stored in the common configuration memory to the common coarse-grained array unit, thereby controlling performing of the respective processing operation.

6. The apparatus of claim 4, wherein when the common coarse-grained array unit becomes available while the respective processing operation is being performed by the exclusive coarse-grained array unit, the configuration information providing controller controls provision of configuration information for distributing a data value generated during the respective processing operation to the common coarse-grained array unit.

7. The apparatus of claim 1, wherein the controller prevents a supply voltage from being supplied to another reconfigurable operation mode execution unit which does not operate, thereby reducing power consumption.

8. The apparatus of claim 1, wherein the size of each respective exclusive coarse-grained array of each reconfigurable operation mode execution unit, is smaller in size than the size of the common coarse-grained array.

9. A method of a controller for providing multiple modes, the method comprising:
   receiving, from a respective reconfigurable operation mode execution unit, a request to use a common coarse-grained array to perform a respective processing operation, wherein the common coarse-grained array is shared temporally by a plurality of reconfigurable operation mode execution units;

determining whether the common coarse-grained is available or whether the common coarse-grained array is processing an operation for another reconfigurable operation mode execution unit;

if the common coarse-grained array is available, transferring a signal for allowing use of the common coarse-grained array to the respective reconfigurable operation mode execution unit; and if the coarse-grained array is not available, controlling an exclusive coarse-grained array of the respective reconfigurable operation mode execution unit to process the respective processing operation, wherein the exclusive coarse-grained array of the respective reconfigurable operation mode execution unit is not shared with other reconfigurable operation mode execution units.

10. The method of clam 9, further comprising, if the common coarse-grained array unit becomes available while the respective processing operation is being performed by the exclusive coarse-grained array unit, controlling the exclusive coarse-grained array unit to stop performing the processing operation, and controlling the common coarse-grained array unit to successfully perform the remainder of the stopped processing operation.

11. The method of claim 10, wherein the controlling of the common coarse-grained array unit to process the stopped processing operation comprises:

searching for an address of a common configuration memory including configuration information corresponding to configuration information of the stopped processing operation;

transferring configuration information located in address next to the address of the common configuration memory to the common coarse-grained array unit;

distributing the result of data processing obtained before the exclusive coarse-grained array unit stops performing the processing operation, to the common coarse-grained array unit.

* * * * *